United States Patent [19]

Norton

[11] 4,343,961
[45] Aug. 10, 1982

[54] TEMPERATURE SENSING DEVICE HAVING A ROTATING REFERENCE MEMBER

[75] Inventor: W. Jack Norton, Kittanning, Pa.

[73] Assignee: PPG Industries, Inc., Pittsburgh, Pa.

[21] Appl. No.: 135,836

[22] Filed: Mar. 31, 1980

[51] Int. Cl.³ .................. G01K 7/08; H01L 35/02
[52] U.S. Cl. ..................... 136/230; 374/120; 374/153; 374/179
[58] Field of Search .............. 73/351, 341, 359 R; 136/230; 250/338; 65/158

[56] References Cited

U.S. PATENT DOCUMENTS

| | | | |
|---|---|---|---|
| 2,007,118 | 7/1935 | Bosomworth | 136/4 |
| 2,618,672 | 11/1952 | Cizmadia et al. | 136/4 |
| 2,991,654 | 7/1961 | Engelhard | 73/359 |
| 3,183,718 | 5/1965 | Schnedler | 73/351 |
| 3,191,437 | 6/1965 | Heard, Jr. | 73/359 X |
| 3,246,519 | 4/1966 | Dornberger | 73/341 |
| 3,309,236 | 3/1967 | Gunji | 116/230 |
| 3,534,610 | 10/1970 | Pruden | 73/351 |
| 3,813,515 | 5/1974 | Van Toorn | 73/341 |
| 4,046,009 | 9/1977 | Saur | 73/351 X |
| 4,199,985 | 4/1980 | Tarumi et al. | 73/351 |

Primary Examiner—Daniel M. Yasich
Attorney, Agent, or Firm—Donald Carl Lepiane

[57] ABSTRACT

A device for continually sensing the temperature of an advancing glass ribbon has a thermocouple temperature sensing junction mounted within the area circumscribed by a pair of rotating wheels and spaced from the periphery of the wheels. The wheels engage the ribbon and are rotated thereby as the temperature sensing junction remains in a fixed position in a plane containing the rotating axis of the wheels and normal to the glass surface to continually sense the temperature of the advancing ribbon.

8 Claims, 6 Drawing Figures

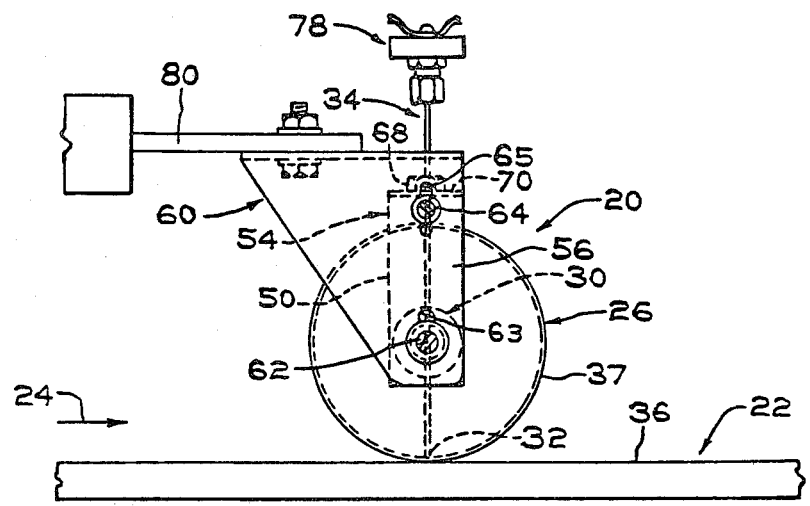
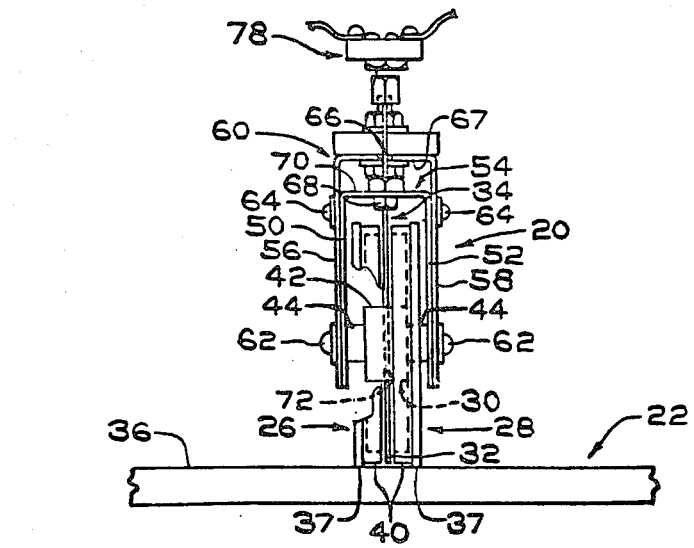

TEMPERATURE SENSING DEVICE HAVING A ROTATING REFERENCE MEMBER

BACKGROUND OF THE INVENTION

1. Field of the Invention

This invention relates to a method of and apparatus for sensing the temperature of a moving substrate, e.g., a glass ribbon.

2. Brief Description of the Temperature Sensing Technology

U.S. Pat. Nos. 2,007,118; 3,183,718; 3,246,519 and 3,813,515 each teach a device for sensing temperature of a moving substrate, e.g., ribbons and/or wires. A common feature of the devices is one or more thermocouples mounted to a rotating member such that the hot junction of the thermocouple rotates with the member to periodically sense the temperature of the substrate. Although this technique is acceptable, increasing the temperature sensing frequency normally requires increasing the number of thermocouples in the rotating member which increases the cost of these devices.

U.S. Pat. No. 2,618,672 teaches the mounting of a thermocouple within a sleeve with the hot junction of the thermocouple spaced from the sleeve end. The temperature measuring device of U.S. Pat. No. 2,618,672 is acceptable for sensing temperature of a stationary article but is not easily adapted for sensing the temperature of a moving article. This is because contacting the article surface can result in marring the surface.

U.S. Pat. No. 3,309,236 teaches a thermocouple apparatus having a thermocouple mounted in a concave reflective member. The member is mounted between three spaced wheels which wheels ride on the substrate surface to support the hot junction above the surface. The limitation of this type of apparatus is that undulations of a moving substrate, for example, resulting from conveyor wear, can result in varying distances between the hot junction of the thermocouple and the substrate. These variations can result in temperature measurement variations which can lead to erroneous conclusions regarding the substrate temperature.

In view of the above, it would be advantageous to provide a temperature sensing device that does not have the limitations of the above-discussed devices.

SUMMARY OF THE INVENTION

This invention relates to a temperature sensing or measuring device having a rotatably mounted wheel, e.g., a rotating wheel mounted on a non-rotating shaft and a thermocouple having its temperature sensing or hot junction spaced from the periphery of the wheel and within the spatial area circumscribed by the wheel. Further, this invention relates to a method of measuring the temperature of the moving substrate, e.g., a glass ribbon, by contacting the ribbon with a freely rotatably mounted wheel and sensing the temperature of the substrate by a thermocouple having its hot junction spaced from the periphery of the rotating wheel and within the spatial area circumscribed by the wheel.

In an embodiment of the invention, a thermocouple is mounted on a shaft between a pair of spaced wheels mounted on the shaft. The shaft is secured against rotational motion but freely movable toward and away from the ribbon. The thermocouple temperature sensing or hot junction lies (1) in a plane containing the axis of the rotating wheels and normal to the glass surface, (2) is spaced from the glass surface and (3) is spaced from the periphery of the wheels to set the hot junction at a fixed spaced distance from the glass surface. As the ribbon is displaced toward and away from the movement path, e.g., as a result of conveyor wear, the wheels remain in contact with the ribbon surface to maintain the fixed spaced distance between the hot junction and the glass ribbon. With this arrangement, errors in temperature readings resulting from varying distances between the heated substrate and the thermocouple hot junction is minimized if not eliminated.

BRIEF DESCRIPTION OF THE DRAWING

FIG. 1 is a side elevated view of a thermocouple assembly incorporating features of the invention for sensing the temperature of a moving substrate;

FIG. 2 is a front elevated view of the thermocouple assembly shown in FIG. 1 having one wheel fragmented for purposes of more clearly illustrating the configuration of the wheel axle;

FIG. 3 is a top plan view of the thermocouple assembly shown in FIG. 1;

DESCRIPTION OF THE INVENTION

Figure 4:
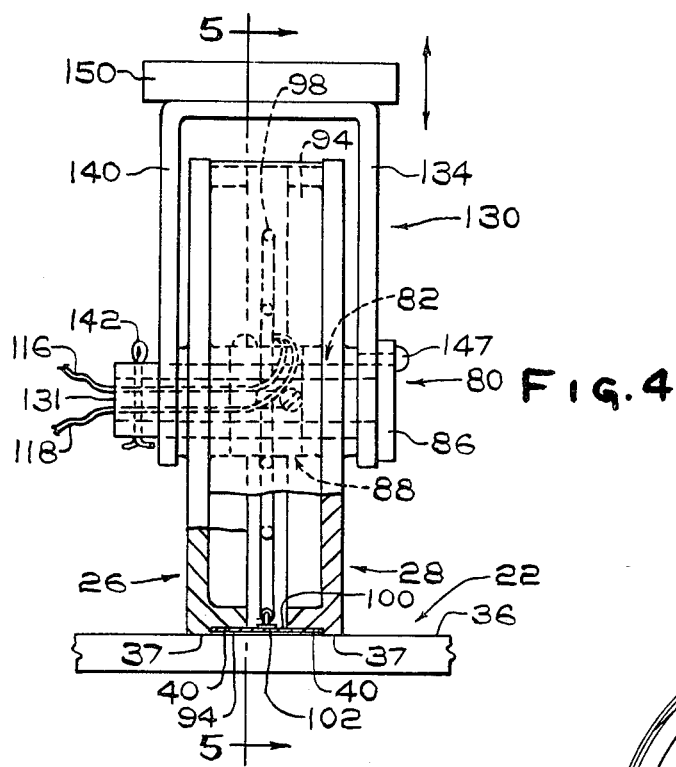
FIG. 4 is a front elevated view having portions removed for purposes of clarity illustrating a further embodiment of the thermocouple assembly incorporating features of the invention for sensing temperature of a moving substrate.

With reference to FIGS. 1–3, there is shown temperature sensing device 20 incorporating features of the invention for sensing the temperature of substrate 22, e.g., a glass ribbon, moving in the direction of the arrow 24 as shown in FIG. 1. The device 20 includes a pair of spaced wheels 26 and 28 mounted for free rotation and vertical displacement on non-rotating axle 30 (see FIG. 3) with temperature sensing or hot junction 32 of thermocouple 34 spaced from ribbon surface 36 and within the spatial area circumscribed by the rotating wheels 26 and 28. With this arrangement (1) ribbon displacement above or below the ribbon movement path resulting from conveyor wear; (2) variation in ribbon thickness and (3) other effects to vertically displace the ribbon relative to the movement path collectively hereinafter referred to as ribbon undulations do not vary the spaced distance between the thermocouple hot junction 32 and ribbon surface 36. This is because the wheels 26 and 28 move with the ribbon undulations. Preferably, and as shown in FIGS. 1 and 2, the thermocouple hot junction 32 lies in a plane containing the rotating axis of the wheels 26 and 28 and transverse, e.g., normal, to the glass surface 36 to space the thermocouple hot junction from the ribbon surface 36. Maintaining the thermocouple hot junction 32 at a fixed spaced distance from the ribbon surface 36, temperature error due to variations in spaced distances between the hot junction and the ribbon surface are minimized if not eliminated.

In a constructed temperature sensing device incorporating features of the invention, the wheels 26 and 28 are identical in construction. Each of the wheels have a peripheral rim portion 37, e.g., having a diameter of about 3.25 inches (8.3 centimeters) and a thickness of about ⅛ inch (0.32 centimeters) and a reference rim portion 40 having a diameter less than the diameter of the peripheral rim portion 37, e.g., about 0.001 inch (0.25 millimeters) less and a width of about ¼ inch (0.64 centimeters). The thermocouple hot junction 32 is aligned with reference rim portion 40. Preferably, the difference between the diameter of the peripheral rim portion 37 and the reference rim portion 40 is at a minimum so that the spaced distance between the thermocouple hot junction 32 and the ribbon surface 36 is at a minimum without contacting the ribbon surface. With reference to FIG. 2, the axle 30 has a center portion 42 having a diameter greater than the diameter of the end portions 44 to receive and maintain the wheels 26 and 28 spaced from one another. For example, an axle used in the practice of the invention has a length of about 1¼ inches (3.97 centimeters), a center portion having a length of about ⅝ inch (1.59 centimeters) and a diameter of about 1 inch (2.54 centimeters) and end portions having a diameter of about 0.5 inch (1.27 centimeters) to support the wheels 26 and 28 and maintain the reference rim portion 40 spaced about ⅛ inch (0.32 centimeters) apart.

The axle 30 having the wheels 26 and 28 mounted thereon are positioned between legs 50 and 52 of inner bracket 54 with the inner bracket 54 mounted between legs 56 and 58 of outer bracket 60. The axle 30 is secured in position by screws 62 passing through slots 63 in the legs 56 and 58 of the outer bracket 60 (slot 65 shown only in the leg 56 of the bracket 60 in FIG. 1); and holes (not shown) in the legs 50 and 52 of the bracket 54 and threaded into end portions 44 of the axle 30. Additional screws 64 pass through slots 65 in the legs 56 and 58 of the bracket 60 (slot 65 shown only in the leg 56 of the bracket 60 in FIG. 1) and are secured in the legs 50 and 52 of the inner bracket 54 to prevent rotational motion of the inner bracket 54 and for sliding the inner bracket 54 in the outer bracket 60 to position the wheels 26 and 28 on the ribbon surface 36.

The thermocouple 34 has a rigid body portion passing through groove 66 (see FIG. 2) of center leg 67 of the outer bracket 60, gland 68 mounted in center leg 70 of the inner bracket 56 through hole 72 in center portion 42 of the axle 30 with the hot junction 32 of the thermocouple 34 aligned with outer surface of the reference rim portion 40. The rigid body portion of the thermocouple 34 prevents rotation of the axle 30 as the wheels 26 and 28 rotate. Electrical connection to the thermocouple wires is conveniently made by a thermocouple connection collar 78 of the type known in the art.

With reference to FIGS. 1 and 2, the outer bracket 60 is connected by plate member 80 to conveniently secure the device 20 over the moving ribbon 22. In operation the screws 62 and 64 are loosened to slide the inner bracket 54 by the force of gravity downward as viewed in FIGS. 1 and 2 to set the wheels 26 and 28 in contact with the ribbon surface 36. Undulation in the ribbon 22 as it advances along its movement path moves the wheels 26 and 28 in the same direction as the undulation to maintain the wheels in contact with the ribbon surface. The wheels 26 and 28 may be held above the ribbon surface by moving the inner bracket 54 upward as viewed in FIGS. 1 and 2 in the outer bracket 60 afterwhich the screws 62 and 64 are tightened.

Figure 5:
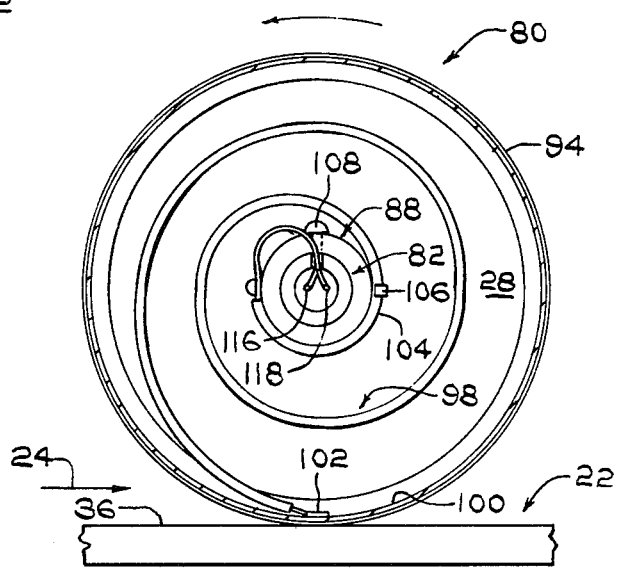
FIG. 5 is a view taken along lines 5—5 of FIG. 4.
Figure 6:
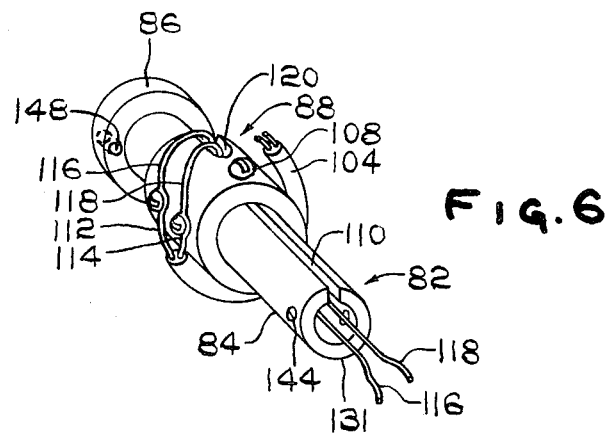
FIG. 6 is an isometric view of the shaft of the thermocouple assembly shown in FIGS. 4 and 5 to illustrate external electrical connection to the internal thermocouple.

Shown in FIGS. 4 and 5 is temperature sensing device 80 having features of the instant invention which include the wheels 26 and 28 mounted on axle 82 shown better in FIG. 6. The axle 82 includes a hollow shaft 84 having headed end 86 and sleeve 88 mounted thereon.

Referring now to FIGS. 4 and 5, an endless band or strip 94 supported by the reference rim portion 40 and flush with the peripheral rim portion 37 provides an enclosure for coiled thermocouple 98 and an inner surface 100 on which flattened thermocouple temperature sensing or hot junction 102 rides as the wheels 26 and 28 and strip 94 are rotated by the advancing ribbon 22.

With specific reference to FIGS. 5 and 6, thermocouple end portion 104 is secured around non-electrical conducting collar 88 by clip 106 and the collar 88 secured against rotation by screw 108 passing through the collar 88 into slit 110 of the hollow shaft 84. In other words, the screw 108 passing through the collar 88 into the slit 110 of the shaft 84 secures the collar 88 on the shaft 82 to prevent rotation of the collar 88 relative to the shaft 84. In this manner, securing the shaft 84 against rotation secures the collar 88 against rotation. External electrical connection is made to thermocouple wires 112 and 114 by wires 116 and 118, respectively, having their course through groove 120 in the collar 88, through the slit 110 of the axle 82 and out of the enclosure through the hollow shaft 84.

With reference to FIG. 4, the device 80 is mounted on holding member 130 by passing end 131 of the shaft 84 through hole (not shown) in leg 134 of the member 130 and mounting the wheel 28 and collar 88 on the shaft 84. The coiled thermocouple 98 is mounted on the collar 88 by the clip 106 and conveniently connected to external wires 116 and 118. The band 94 is mounted on the rim portion 40 of the wheel 28 after which rim portion 40 of the wheel 26 is mounted in the band 94 to enclose the coiled thermocouple. The end 131 of the shaft is passed through the wheel 26 and hole (not shown) in the leg 140 of the member 130. A pin 142 mounted through hole 144 in shaft end portion 131 (see FIG. 6) secures the device 80 together. The shaft 84 of the axle 82 is secured against rotation by screw 147 (FIG. 4) passing through hole 148 (FIG. 6) in collar 86 into the leg 134 of the member 130. In other words, the screw 147 shown in FIG. 4 passing through the collar 86 into the leg 134 prevents the shaft 82 from rotating while the wheels 26 and 28 and band 94 are free to rotate on the shaft 82. The screw 108 passing through the collar 88 into the slit 110 of the now stationary shaft 84 prevents the collar 88 from rotating. The member 130 is secured to elevator 150 which raises the device 80 to space the wheels 26 and 28 above the ribbon surface 36 to a non-engaging position and releases the member 130 for free vertical movement for the wheels 26 and 28 to ride on the ribbon surface 36 in a temperature sensing position. As the wheels rotate the thermocouple junction 102 remains in position over the ribbon surface 36 as shown in FIG. 5 because the thermocouple 98 is secured by the clip 106 to the collar 88 which is secured against rotation in the manner discussed above.

With reference to FIG. 5, as the wheels 26 and 28 and band 94 rotate in a counterclockwise direction with the glass ribbon 22 moving in the direction of the arrow 24, e.g., from left to right, the thermocouple hot junction 102 is maintained in a relatively stationary position riding over the surface 100 of the strip 94. With the arrangement of the instant invention as discussed for temperature sensing device 20 of FIGS. 1–3 and temperature sensing device 80 of FIGS. 4 and 5, continuous temperature sensing of the ribbon can be performed using only one thermocouple and spacing the stationary thermocouple hot junction from the ribbon surface to prevent marring of the surface.

As can now be appreciated, the above examples were presented to illustrate various embodiments incorporating features of the invention and the invention is not limited thereto, for example, the materials of the thermocouple are not limiting to the invention. Further, the materials for making the wheels and strip are not limiting to the invention and any of the materials such as steel, plastic, carbon or alloys of various metals may be used depending on the temperature and the environment of anticipated use. Still further, the thermocouple temperature sensing device of the instant invention may be used to monitor the temperature of a stationary sheet by rolling the wheels over the stationary sheet. Although in the discussion of temperature sensing device 80 the enclosure for the coiled thermocouple was constructed from the wheels 26 and 28 and the strip 94, it can be appreciated by those skilled in the art that the enclosure may be constructed using other various techniques without deviating from the scope of the instant invention.

What is claimed is:

1. A device for sensing temperature of a moving substrate, comprising:
    an axle;
    at least one wheel having a rim portion mounted on said axle for free rotation to circumscribe a circular path defining a spatial area;
    a thermocouple having a temperature sensing junction;
    means for mounting said thermocouple to said axle with said temperature sensing junction relative to said rim portion of said at least one wheel in a substantially fixed relationship to a point along the circular path and within the spatial area circumscribed by said at least one wheel;
    means mounting said axle for positioning said at least one wheel in a relationship to the substrate to be measured; and
    means mounting said axle and said positioning means for preventing relative motion therebetween.

2. The device as set forth in claim 1 wherein said at least one wheel is a first wheel; said rim portion includes a peripheral rim portion and a reference rim portion; said thermocouple includes a rigid body portion; and said preventing means includes said rigid body portion of said thermocouple mounted in said axle and to said positioning means; and further including:
    a second wheel;
    means for mounting said wheel on said axle in spaced relation to one another with at least a portion of said thermocouple therebetween and with said temperature sensing junction spaced relative to said reference rim portion of said at least one wheel.

3. The device as set forth in claim 2 wherein said positioning means includes:
    a first generally U-shaped member;
    a second generally U-shaped member slideable within said first U-shaped member;
    means for mounting said axle within outer legs of said second U-shaped member; and
    said preventing means includes means for securing said rigid body portion of said thermocouple to at least one of said generally U-shaped members.

4. The device as set forth in claim 1 wherein said wheel is a first wheel and further including a second wheel having a rim portion, said rim portion of each wheel includes a peripheral rim portion and a supporting rim portion with said peripheral rim portion having a diameter greater than diameter of said supporting rim portion and further including:
    an endless strip mounting said supporting rim portion of each of said wheels to provide an enclosure between said wheels;
    said temperature sensing junction of said thermocouple riding on inner surface of said strip as said wheels rotate and said means for mounting mounts said thermocouple to axle portion within said enclosure to maintain the substantially fixed relationship of said temperature sensing junction to the point along the circular path.

5. The device as set forth in claim 4 wherein
    said positioning means include a U-shaped member;
    said preventing means includes:
        said axle mounted between outer legs of said U-shaped member with said wheels therebetween; and
        means for securing said axle to at least one of said outer legs of said U-shaped member to prevent relative motion between said axle and said U-shaped member; and further including:
        means for providing external electrical access to said thermocouple mounted within said enclosure.

6. The device as set forth in claim 1 or 2 or 4 wherein the substrate is a glass ribbon advancing along a movement path and said positioning means further includes:
    means for moving said axle toward and away from the movement path.

7. A method of supporting a temperature sensing junction of a thermocouple in a fixed spaced relationship to a substrate advancing along a movement path, comprising the steps of:
    providing at least one wheel on an axle, the wheel having a rim portion and freely rotating on the axle to circumscribe a circular path defining a spatial area;
    fixing the thermocouple to the axle to position the temperature sensing junction within the spatial area relative to the rim portion;
    maintaining the axle in a stationary position relative to the at least one wheel to maintain the temperature sensing junction in a relatively fixed relationship to a point along the circular path;
    mounting the axle for movement toward the movement path to engage the substrate surface and away from the movement path to space the at least one wheel from the substrate surface; and
    moving the at least one wheel and substrate relative to one another with the at least one wheel riding on surface of the substrate to roll the at least one wheel over the substrate surface with the sensing junction in a fixed spaced relationship to the substrate surface.

8. The method as set forth in claim 7 wherein the substrate is a glass ribbon.

* * * * *

UNITED STATES PATENT AND TRADEMARK OFFICE
CERTIFICATE OF CORRECTION

PATENT NO. : 4,343,961
DATED : August 10, 1982
INVENTOR(S) : W. Jack Norton

It is certified that error appears in the above–identified patent and that said Letters Patent are hereby corrected as shown below:

Claim 2, column 5, line 53, "wheel" should be --wheels--.

Signed and Sealed this

Seventeenth Day of May 1983

[SEAL]

Attest:

DONALD J. QUIGG

Attesting Officer          Acting Commissioner of Patents and Trademarks